(12) United States Patent
Simileysky et al.

(10) Patent No.: US 12,284,567 B2
(45) Date of Patent: Apr. 22, 2025

(54) HIGHER ACCURACY SECURE PHASE-BASED RANGING AND DIRECTION FINDING

(71) Applicant: Cypress Semiconductor Corporation, San Jose, CA (US)

(72) Inventors: Victor Simileysky, San Jose, CA (US); Kiran Uln, Pleasanton, CA (US); James Wihardja, Tustin, CA (US); Pouria Zand, Irvine, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 543 days.

(21) Appl. No.: 17/527,104

(22) Filed: Nov. 15, 2021

(65) Prior Publication Data
US 2023/0156423 A1 May 18, 2023

(51) Int. Cl.
*H04W 4/02* (2018.01)
*G01S 5/02* (2010.01)
*G01S 5/10* (2006.01)
*H04W 4/80* (2018.01)

(52) U.S. Cl.
CPC .......... *H04W 4/023* (2013.01); *G01S 5/0221* (2013.01); *G01S 5/10* (2013.01); *H04W 4/80* (2018.02)

(58) Field of Classification Search
CPC .............................. G01S 5/0009; H04W 4/023
See application file for complete search history.

(56) References Cited

U.S. PATENT DOCUMENTS 3,699,459 A * 10/1972 Watson .................. G01S 1/245
                                            327/261
10,791,427 B1 * 9/2020 Mueller ............ H04W 28/0268
2013/0094540 A1 * 4/2013 Jin ........................ H04B 1/709
                                            375/147

(Continued)

FOREIGN PATENT DOCUMENTS

| JP | 2015207811 A | 11/2015 |
| KR | 100923121 B1 | 10/2009 |

OTHER PUBLICATIONS

Japanese Office Action from Application 2022-181597 dated Oct. 11, 2023; 2 pages.

(Continued)

*Primary Examiner* — Fabricio R Murillo Garcia

(57) ABSTRACT

A system and method for improving the accuracy of a secure phase-based ranging procedure and a Direction Finding procedure. The method includes receiving radio frequency signals from a second communication device. The method includes operating in a first mode including generating first location data based on the radio frequency signals and, transferring the first location data to a second processor in compliance with a Bluetooth Host Control Interface. The method includes comparing one or more conditions to one or more threshold values and responsive to the comparing transitioning from operating in the first mode to operating in a second mode. The method includes, while operating the second mode, generating second location data based on the radio frequency signals and, transferring the second location data to the second processor at a higher data transfer rate than the transferring of the first location data to the second processor.

20 Claims, 4 Drawing Sheets

(56) References Cited

U.S. PATENT DOCUMENTS

| | | | |
|---|---|---|---|
| 2014/0011469 A1* | 1/2014 | Fenn | H04W 4/90 |
| | | | 455/404.1 |
| 2014/0094198 A1* | 4/2014 | Heo | H04W 52/0274 |
| | | | 455/456.4 |
| 2019/0049551 A1* | 2/2019 | Miller | G01S 5/0226 |
| 2022/0299621 A1* | 9/2022 | Werner | H04W 64/006 |
| 2023/0144497 A1* | 5/2023 | Van De Sluis | G01S 1/02 |
| | | | 342/385 |

OTHER PUBLICATIONS

E. Lee, "High Accuracy Distance Measurement for Bluetooth Based on Phase Ranging", Session : De-facto Standard Development Organization #3, 24 pgs. (May 24, 2019).

* cited by examiner

HIGHER ACCURACY SECURE PHASE-BASED RANGING AND DIRECTION FINDING

TECHNICAL FIELD

The present disclosure relates generally to the field of wireless telecommunications, and more particularly, to enhanced systems and methods for improving the accuracy of wireless device location measurements.

BACKGROUND

Narrow-band radios such as Bluetooth Low Energy (LE) or IEEE 802.15.4 radios may determine the location of a wireless device relative to another wireless device. Procedures for determining the location (e.g., distance, angle) of wireless devices may include secure phase-based ranging procedures and the Direction Finding (DF) procedures. These procedures may apply a phase-based approach or a round-trip time (RTT) approach.

BRIEF DESCRIPTION OF THE DRAWINGS

The present disclosure is illustrated by way of example, and not by way of limitation, in the figures of the accompanying drawings in which like reference numerals refer to similar elements and in which.

DETAILED DESCRIPTION

Figure 1:
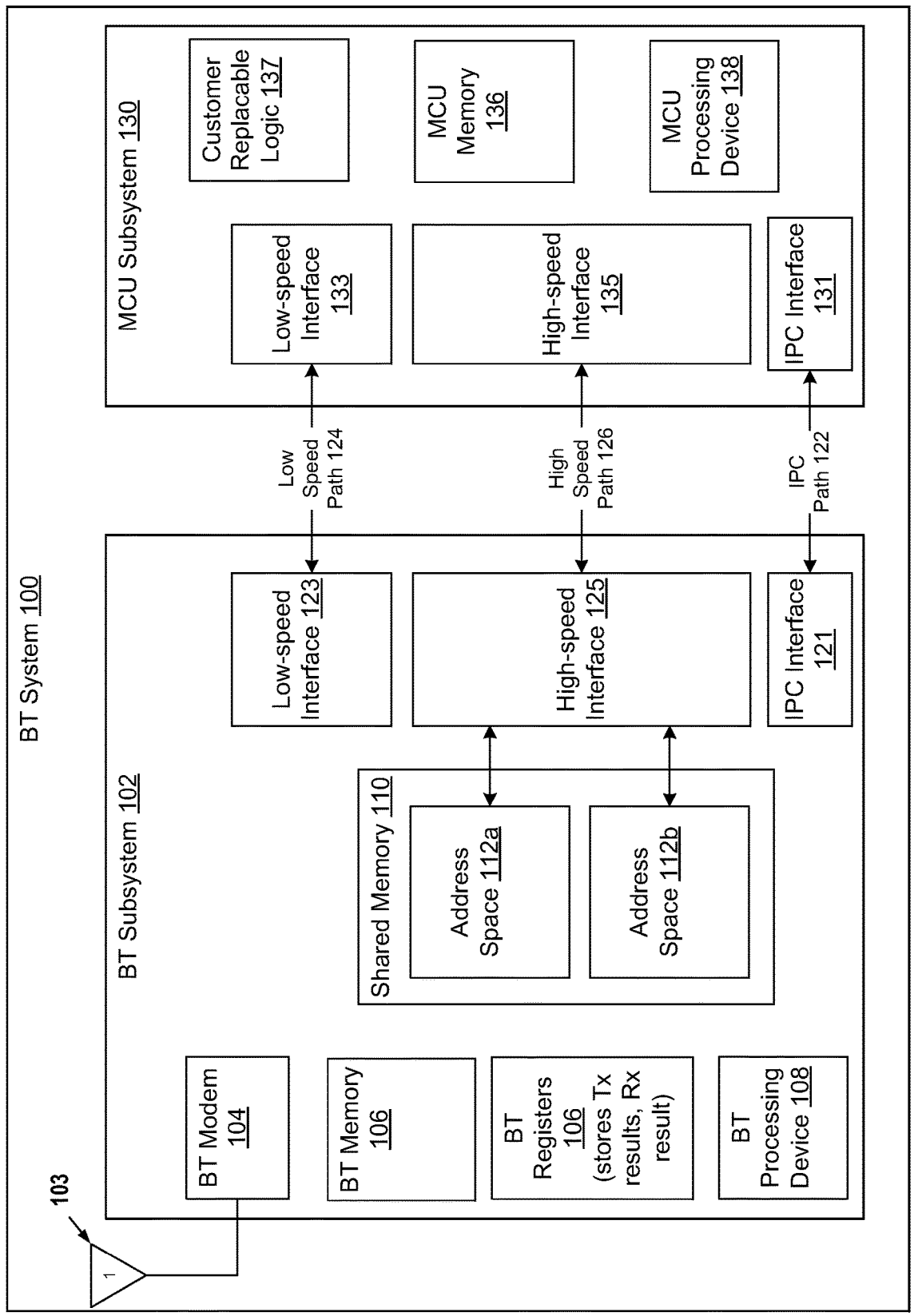
FIG. 1 illustrates a block diagram of an example Bluetooth system that improves the accuracy of wireless device location measurements, according to some embodiments.

The following description sets forth numerous specific details such as examples of specific systems, components, methods, and so forth, in order to provide a good understanding of various embodiments of the techniques described herein for improving the accuracy of location measurements, for example using secure phase-based ranging procedures and Direction Finding (DF) procedures for determining the location of wireless devices. It will be apparent to one skilled in the art, however, that at least some embodiments may be practiced without these specific details. In other instances, well-known components, elements, or methods are not described in detail or are presented in a simple block diagram format in order to avoid unnecessarily obscuring the techniques described herein. Thus, the specific details set forth hereinafter are merely exemplary. Particular implementations may vary from these exemplary details and still be contemplated to be within the scope of the present disclosure.

Wireless technologies such as Bluetooth (BT) use positioning technologies, such as secure phase-based ranging and Direction Finding (DF) to determine the position/location of wireless devices. In secure phase-based ranging, a distance measurement application may determine the distance between two wireless devices based on a phase-based approach or a round-trip time (RTT) approach. In the phase-based approach, the two wireless devices exchange Constant Tones (CT) signals and one device performs a phase and/or frequency measurement based on the CT signals. In the RTT approach, the two wireless devices exchange RTT packets and timing reports/measurements.

Direction Finding may be based on the concepts of angle of arrival (AoA) and angle of departure (AoD). Direction finding can make use of the angular phase-shifts that occur between the antennas of a wireless device that receives (AoA) or transmits (AoD) radio frequency (RF) signals. With the use of antenna arrays at either side of the communication link, phase shift data can be determined and from this, location and angle of direction can be calculated.

Both the secure phase-based ranging and Direction Finding procedures may rely, at least in some part, on a digitized radio signal represented in an in-phase and quadrature-phase (I/Q) format, from which distance information and angular information is extracted. In embodiments, a Bluetooth radio of a Bluetooth system (e.g., including a BT radio, a BT processor, and/or a memory, etc.) is capable of generating the digitized radio signal by sampling the incoming radio signal (sometimes referred to as, radio frequency signal) that it receives at its antenna using a high sampling rate (e.g., 12 megahertz (MHz)). The BT system may report secure phase-based ranging and Direction Finding results to an application executing on a host via a Bluetooth Host Control Interface (HCI), such as a Universal Asynchronous Receiver-Transmitter (UART).

For several reasons, however, the secure phase-based ranging and Direction Finding procedures may produce inaccurate results. First, the Bluetooth Location Services requires a Bluetooth system to perform the secure phase-based ranging and/or Direction Finding procedures on an incoming signal using a low sampling rate to generate a low-bandwidth result (sometimes referred to as, "low-bandwidth data"). According to the Bluetooth Location Services requirement, the low-bandwidth result of the secure phase-based ranging procedure does not include raw I/Q data/samples, but rather various phase and time measurements that are derived from the captured radio signal. The low-bandwidth result of the Direction Finding procedure is generated by sampling the raw I/Q dataset using a low sampling rate (e.g., 1 MHz), even though the Bluetooth system is capable of sampling at a high sampling rate (e.g., 12 MHz).

The Bluetooth Location Services prefer the low-bandwidth output of the secure phase-based ranging and/or Direction Finding procedures in order to meet transport requirements outside of the Bluetooth system. These requirements are considered in the Bluetooth Location Services as the Bluetooth HCI, which is a low-bandwidth interface. The Bluetooth system must reduce the bandwidth of the secure phase-based ranging and Direction Finding results in order for the Bluetooth system to be able to transfer the result, as a low-bandwidth result, across the low-bandwidth UART. In other words, the amount of data that can be delivered outside of the Bluetooth system is limited by the maximum speed (e.g., 3 MHz or 4 MHz) of its UART interface. Consequently, only a portion of the data that is generated by the Bluetooth system (e.g., by the BT modem) can be exported (e.g., transferred) outside of the Bluetooth system.

Second, the processor that is built into the Bluetooth system has less processing power than the processor that is built into the Micro Control Unit (MCUs) that is coupled to the Bluetooth system. As a result, the amount of calculation the Bluetooth system can perform to convert the raw I/Q dataset that is sampled at the high sampling rate (e.g., 12 MHz) to the lower-bandwidth format is limited, which leads to a non-optimal performance (e.g., low resolution, less accurate result) of the secure phase-based ranging and Direction-Finding procedures.

Third, because the algorithm that processes the raw I/Q dataset is within the Bluetooth system, it is therefore inaccessible to a customer's host device that is coupled to the Bluetooth system. Therefore, even if a customer has a preferred algorithm that is different than what is provided in the Bluetooth system's firmware, the customer cannot implement it because they do not have access to the raw I/Q dataset. The conventional systems implement precisely the data output format (e.g., low-bandwidth result) that is required in the Bluetooth Location Services, where there is no raw I/Q data available for the secure phase-based ranging procedure, and only a low sampling rate (e.g., 1 MHz) for the Direction Finding procedure; thereby preventing customer choice in algorithms used for these procedures.

Aspects of the disclosure address the above-noted and other deficiencies by disclosing enhanced systems and methods for implementing a secure phase-based ranging and Direction Finding procedure to accurately determine the position/location of wireless devices. As described in the below passages, the BT system utilizes two processors, each with their own memory (e.g., random access memory (RAM)) along with an additional, smaller shared memory pool that is accessible to both processors. The first processor is a low-performance processor that resides in a BT subsystem of the BT system and is configured to operate the components of the BT subsystem (e.g., BT radio, etc.). The second processor is a high-performance processor that resides in a Micro Control Unit (MCU) of the BT system.

The Bluetooth (BT) system is coupled to the MCU via two datapaths that allow the BT subsystem to report the results (e.g., including events) from the secure phase-based ranging and Direction Finding procedures to the MCU. The BT subsystem uses the first data path to report the low-bandwidth result of the secure phase-based ranging and Direction Finding procedures, as required by the Bluetooth Location Services. The BT subsystem uses the second data path to rapidly transfer large, raw I/Q data buffers to the higher performance processor (MCU). The MCU is programmable by a customer, such that it allows a customer to directly access (e.g., retrieve) the complete raw I/Q dataset in case the customer wishes to apply custom processing algorithms in the MCU.

The BT system includes a mode selector to control automated switching between the high-bandwidth mode and the low-bandwidth mode to consume less power when the higher performance is not necessary, as higher data throughput naturally consumes more power. Customers have a control mechanism to select the appropriate method of operation given various conditions and applications. Accordingly, embodiments described herein can be used to generate more accurate location determinations compared to conventional BT location procedures.

FIG. 1 illustrates a block diagram of an example Bluetooth system that improves the accuracy of wireless device location measurements. The BT system 100 (sometimes referred to as, "communication device") includes a Bluetooth (BT) subsystem 102 and a Micro Control Unit (MCU) subsystem 130. In some embodiments, the BT subsystem 102 and the MCU subsystem 130 are on the same semiconductor chip. In some embodiments, the BT subsystem 102 and the MCU subsystem 130 are on different semiconductor chips, for example, the BT subsystem 102 is on a first semiconductor chip and the MCU subsystem 130 is on a second semiconductor chip.

The BT subsystem 102 includes an antenna 103 configured to receive one or more incoming signals from a wireless device (e.g., another BT system 100, another BT subsystem 102). The BT subsystem 102 includes a BT modem 104 configured to modulate signals using one or more modulation schemes (e.g., frequency-shift keying (FSK), phase-shift keying (PSK)) and transmit the modulated signals toward a wireless device (e.g., another BT system 100, another BT subsystem 102), via the antenna 103.

In some embodiments, the BT modem 104 may be configured to receive one or more incoming signals from the wireless device responsive to transmitting the modulated signals toward the wireless device. In some embodiments, the BT modem 104 may be configured to generate I/Q data (sometimes referred to as, "raw I/Q dataset") based on the one or more incoming signals and using a sampling rate (e.g., 1 MHz to 12 MHz). For example, the BT modem 104 may be configured to generate a first I/Q dataset using a 1 MHz sampling rate (sometimes referred to as, "low-sampling rate") and generate a second I/Q dataset using a 12 MHz sampling rate (sometimes referred to as, "high-sampling rate"). In this instance, the second I/Q dataset contains more samples (e.g., data points) than the first I/Q dataset.

The BT system 100 includes a BT processing device 108. The BT system 100 includes a BT memory 106 coupled to the BT processing device 108 configured to store instructions (including temporary data) that are executed by the BT processing device 108.

The BT system 100 includes a shared memory 110 configured to store data (e.g., measurements, I/Q data, header and control data, etc.) to share with the MCU subsystem 130. In some embodiments, the shared memory 110 includes an address spaces 112a, 112b. In some embodiments, an address space (e.g., a range of memory locations) may be any size, for example, 4 kilobytes (KB).

The BT system 100 includes a low-speed interface 123, a high-speed interface 125, and an inter-processor communication (IPC) interface 121. One or more of the blocks and/or components of the BT subsystem 102 may be coupled together via an internal bus (not shown in FIG. 1) of the BT subsystem 102 to facilitate the transfer of data and/or messages between the components.

The MCU subsystem 130 includes an MCU processing device 138. The MCU subsystem 130 includes an MCU memory (e.g., RAM) 136 coupled to the MCU processing device 138 for storing instructions (including temporary data) that are executed by the MCU processing device 138. The MCU subsystem 130 includes a low-speed interface 123, a high-speed interface 125, and an IPC interface 131. One or more of the blocks and/or components of the MCU subsystem 130 may be coupled together via an internal bus (not shown in FIG. 1) of the MCU subsystem 130 to facilitate the transfer of data and/or messages between the components.

In some embodiments, the low-speed interface 133 of the MCU subsystem 130 is coupled to the low-speed interface 123 of the BT subsystem 102 via a low-speed path 124. In some embodiments, the high-speed interface 125 of the MCU subsystem 130 is coupled to the high-speed interface 125 of the BT subsystem 102 via a high-speed path 126. In some embodiments, the IPC interface 131 of the MCU subsystem 130 is coupled to the IPC interface 121 of the BT subsystem 102 via an IPC path 122.

In some embodiments, the low-speed interface 123 and the high-speed interface 125 of the BT subsystem 102 may be a single interface that supports both low-speed and high-speed communication. For example, the BT subsystem 102 use a single interface (e.g., low-speed interface 123 combined with high-speed interface 125) to send a first dataset to the MCU subsystem 130 across the low-speed path 124 and a second dataset to the MCU subsystem 130 across the high-speed path 126.

In some embodiments, the low-speed interface 133 and the high-speed interface 135 of the MCU subsystem 130 may be a single interface that supports both low-speed and high-speed communication. For example, the MCU subsystem 130 uses a single interface (e.g., low-speed interface 133 combined with high-speed interface 135) to receive a first dataset from the BT subsystem 102 across the low-speed path 124 and a second dataset from the BT subsystem 102 across the high-speed path 126.

In some embodiments, the MCU subsystem 130 uses the low-speed interface 133 to receive (e.g., transfer) a first dataset from the BT subsystem 102 across the low-speed path 124 at a first data transfer rate (e.g., maximum bit rate) and a second dataset from the BT subsystem 102 across the high-speed path 126 at a second data transfer rate, where the second data rate is higher than the first data rate.

In some embodiments, the BT modem 104 may be configured to generate an I/Q dataset (sometimes referred to as, "raw I/Q dataset") based on the one or more incoming signals and using a sampling rate (e.g., 1 MHz to 12 MHz). For example, the BT modem 104 may be configured to generate a first I/Q dataset using a 1 MHz sampling rate and generate a second I/Q dataset using a 12 MHz sampling rate. In this instance, the second I/Q dataset contains more samples (e.g., data points) than the first I/Q dataset. In some embodiments, an I/Q dataset includes data that is in an in-phase and quadrature-phase (I/Q) format.

In some embodiments, the BT subsystem 102 may be configured to perform a secure phase-based ranging procedure (sometimes referred to as, "location measurement") to generate a secure phase-based ranging result (e.g., a phase measurement and/or timing reports/measurements that is shared with the MCU subsystem 130 via the low-speed path 124, where the secure phase-based ranging result indicates a phase measurement and/or timing reports/measurements that combined with the other device's results determines the distance between the BT system 100 and the other wireless device. For example, the BT modem 104 may be configured to receive one or more incoming signals from another wireless device via antenna 103. The BT modem 104 may be configured to generate I/Q data (sometimes referred to as, "high sample-rate (SR) I/Q data") based on the one or more incoming signals using a high-sampling rate (e.g., 12 MHz). The BT modem 104 may be configured to perform a secure phase-based ranging procedure using the high-SR I/Q data (and possibly other data) and a first secure phase-based ranging algorithm to generate a secure phase-based ranging result (sometimes referred to as, "low-bandwidth secure phase-based ranging result") that is compliant to the Bluetooth specification. That is, the BT modem 104 may be configured to use the first secure phase-based ranging algorithm to convert (e.g., format) the high-SR I/Q data into a low-bandwidth secure phase-based ranging result. The BT subsystem 102 may be configured to send (e.g., transfer, export) the low-bandwidth secure phase-based ranging result to the MCU subsystem 130 via the low-speed interface 123 and the low-speed path 124, or the IPC interface 121 and the IPC path 122.

In some embodiments, the BT subsystem 102 may be configured to perform a Direction Finding (DF) procedure (sometimes referred to as, "location measurement") to generate a DF result that is shared with the MCU subsystem 130 via the low-speed path 124, where the DF result indicates an angle (e.g., in degrees, radians) in which another wireless device is positioned with respect to the BT system 100. For example, the BT modem 104 may be configured to receive one or more incoming signals from another wireless device via antenna 103. The BT modem 104 may be configured to generate I/Q data (sometimes referred to as, "low-SR I/Q data") based on the one or more incoming signals using a low sampling-rate (e.g., 1 MHz).

The BT modem 104 may be configured to send the low-SR I/Q data to the BT processing device 108 and/or store the low-SR I/Q data to the BT memory 106. If the low-SR I/Q data is stored in the BT memory 106, then the BT processing device 108 may fetch (e.g., retrieve) the low-SR I/Q data from the BT memory 106. The BT processing device 108 may be configured to send the low-SR I/Q data to the MCU subsystem 130 via the low-speed interface 123 and the low-speed path 124, or the IPC interface 121 and the IPC path 122.

The MCU processing device 138 may be configured to perform, responsive to receiving the low-SR I/Q data, a DF procedure using the low-SR I/Q data and a first DF algorithm (sometimes referred to as, "a first customer-provided DF algorithm) to generate a DF result (sometimes referred to as, "low-bandwidth DF result"). The MCU processing device 138 may be configured to retrieve the first DF algorithm from the customer replaceable logic 137.

In some embodiments, the BT subsystem 102 may be configured to perform a secure phase-based ranging procedure to generate a secure phase-based ranging result that is shared with the MCU subsystem 130 via the high-speed path 126, where the secure phase-based ranging result indicates a phase measurement and/or timing reports/measurements that combined with the other device's results determines the distance between the BT system 100 and the other wireless device. For example, the BT modem 104 may be configured to receive one or more incoming signals from another wireless device via antenna 103. The BT modem 104 may be configured to generate I/Q data (sometimes referred to as, "high sample-rate (SR) I/Q data") based on the one or more incoming signals using a high-sampling rate (e.g., 12 MHz). The BT modem 104 may be configured to send the high-SR I/Q data to the BT processing device 108. The BT processing device 108 may be configured to store the high-SR I/Q data and the low-bandwidth secure phase-based ranging result (which is compliant to the BT specification, as discussed herein) to address space 112a of the shared memory 110. The BT processing device 108 may be configured to retrieve (e.g., obtain, transfer, acquire) the header and control data from the BT memory 106 and store the header and control data to the address space 112a of the shared memory 110.

The BT processing device 108 may be configured to send an IPC message to the MCU subsystem 130 via the IPC interface 121 and the IPC path 122, where the IPC message indicates that data is available to be read from the address space 112a. The MCU processing device 138 may be configured to fetch (e.g., obtain, read, acquire), responsive to receiving the IPC message, the high-SR I/Q data and the low-bandwidth secure phase-based ranging result from the address space 112a via high-speed interface 135 and the high-speed path 126. The MCU processing device 138 may be configured to perform a secure phase-based ranging procedure using the high-SR I/Q data and a second secure phase-based ranging algorithm (e.g., a customer-provided secure phase-based ranging algorithm) to generate a secure phase-based ranging result (sometimes referred to as, "high-bandwidth secure phase-based ranging result").

In some embodiments, the first secure phase-based ranging algorithm and the second secure phase-based ranging algorithm are different. In some embodiments, the high-bandwidth secure phase-based ranging result is not compliant to the Bluetooth specification. In some embodiments, the high-bandwidth secure phase-based ranging result is more accurate than the low-bandwidth secure phase-based ranging result. For example, the low-bandwidth secure phase-based ranging result may indicate the phase measurement and/or timing reports/measurements that combined with the other device's results determines the distance between the BT system 100 and the other wireless device within a 100-150 nano-sec accuracy, and the high-bandwidth secure phase-based ranging result may indicate the phase measurement and/or timing reports/measurements that combined with the other device's results determines the distance between the BT system 100 and the other wireless device in less than a 15 nano-sec accuracy.

In some embodiments, the BT subsystem 102 may be configured to perform a Direction Finding (DF) procedure to generate a DF result that is shared with the MCU subsystem 130 via the high-speed path 126, where the DF result indicates an angle (e.g., in degrees) in which another wireless device is positioned with respect to the BT system 100. For example, the BT modem 104 may be configured to receive one or more incoming signals from another wireless device via antenna 103. The BT modem 104 may be configured to generate I/Q data (sometimes referred to as, "high-SR I/Q data") based on the one or more incoming signals using a high sampling-rate (e.g., 12 MHz). The BT modem 104 may be configured to send the high-SR I/Q data to the BT processing device 108. The BT processing device 108 may be configured to store the high-SR I/Q data to address space 112a of the shared memory 110. The BT processing device 108 may be configured to retrieve the header and control data from the BT memory 106 and store the header and control data to the address space 112a of the shared memory 110.

The BT processing device 108 may be configured to send an IPC message to the MCU subsystem 130 via the IPC interface 121 and the IPC path 122, where the IPC message indicates that data is available to be read from the address space 112a. The MCU processing device 138 may be configured to fetch (e.g., obtain, read, acquire, retrieve), responsive to receiving the IPC message, the high-SR I/Q data from the address space 112a via the high-speed interface 135 and the high-speed path 126. The MCU processing device 138 may be configured to perform a DF procedure using the high-SR I/Q data and a second DF algorithm (e.g., a customer-provided DF algorithm) to generate a DF result (sometimes referred to as, "high-bandwidth DF result"). The MCU processing device 138 may be configured to retrieve the second DF algorithm from the customer replaceable logic 137.

The BT processing device 108 may be configured to store the data/results (e.g., high-SR I/Q data and low-bandwidth secure phase-based ranging result) that were acquired from the secure phase-based ranging procedure for the high-speed path 126 to address spaces 112a, 112b of the shared memory 110 in a ping-pong fashion. For example, the BT processing device 108 may be configured to perform a secure phase-based ranging procedure using a first set of incoming signals to generate a first set of data/results (e.g., high-SR I/Q data and low-bandwidth secure phase-based ranging result), store the first set of data/results to the address space 112a of the shared memory 110, and send an IPC message to the MCU subsystem 130 via the IPC path 122, where the IPC message indicates that data is available to be read from the address space 112a. As the MCU subsystem 130 attempts to retrieve (or is retrieving) the first set of data/results from the address space 112a, the BT processing device 108 may be configured to perform a secure phase-based ranging procedure using a second set of incoming signals to generate a second set of data/results (e.g., high-SR I/Q data and low-bandwidth secure phase-based ranging result), store the second set of data/results to the address space 112a of the shared memory 110, and send an IPC message to the MCU subsystem 130 via the IPC path 122, where the IPC message indicates that data is available to be read from the address space 112b. The BT processing device 108 may determine that the MCU subsystem 130 has retrieved the first set of data/results from address space 112a, and proceed to repeat the secure phase-based ranging procedures using successive sets of incoming signals and storing the data/results in address spaces 112a, 112b. Likewise, the BT processing device 108 may be configured to store the data/results (e.g., high-SR I/Q data) that were acquired from the DF procedure for the high-speed path 126 to address spaces 112a, 112b of the shared memory 110 in a ping-pong fashion.

Figure 2:
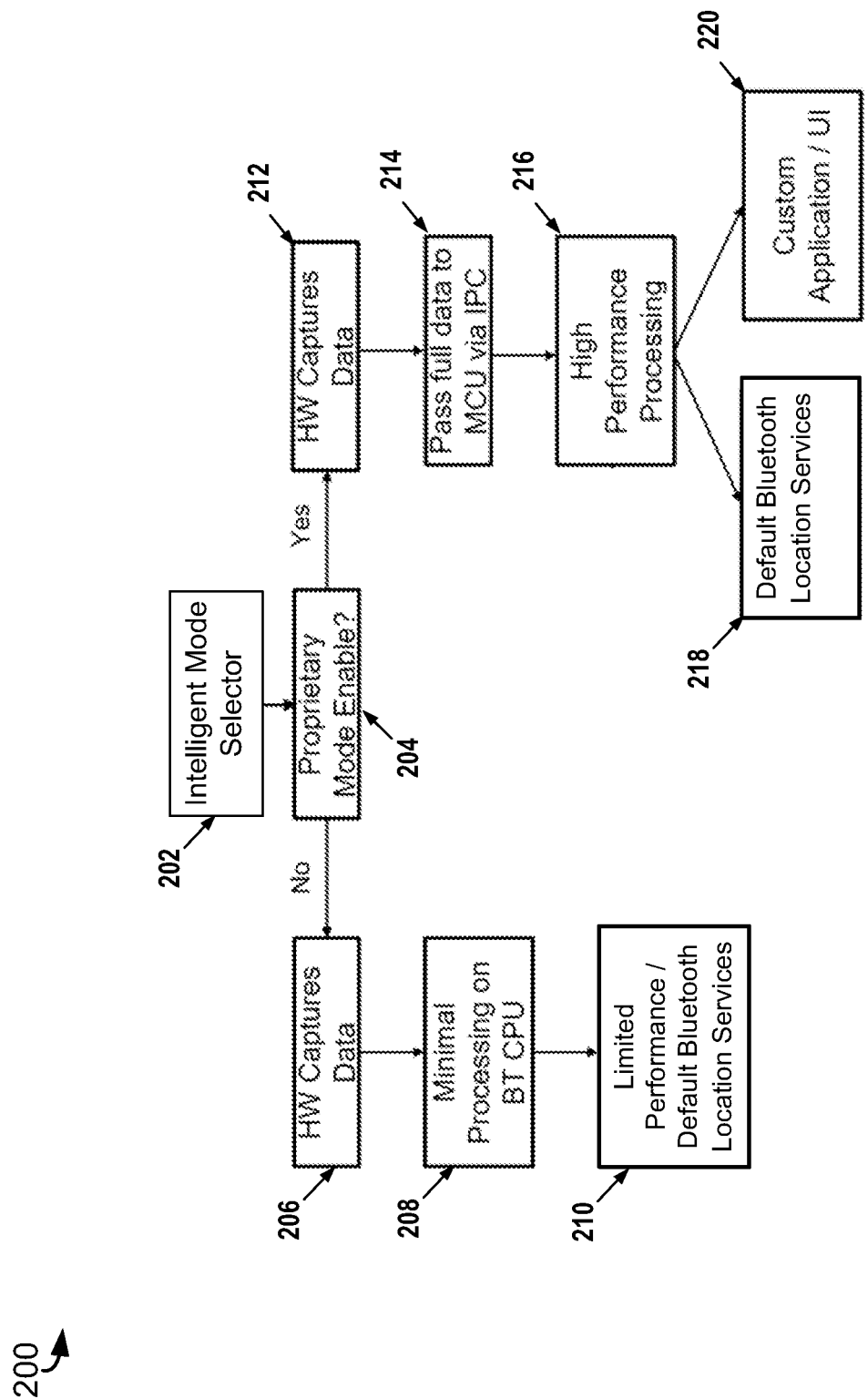
FIG. 2 is a flow diagram of a method for selecting between a standard mode and an enhanced proprietary mode, according to some embodiments.

FIG. 2 is a flow diagram of a method for selecting between a standard mode and an enhanced proprietary mode, according to some embodiments. Although the operations are depicted in FIG. 2 as integral operations in a particular order for purposes of illustration, in other implementations, one or more operations, or portions thereof, are performed in a different order, or overlapping in time, in series or parallel, or are omitted, or one or more additional operations are added, or the method is changed in some combination of ways. In some embodiments, the method 200 may be performed by processing logic that comprises hardware (e.g., circuitry, dedicated logic, programmable logic, microcode, etc.), firmware, or a combination thereof. In some embodiments, some or all operations of method 200 may be performed by one or more components of the BT system 100 in FIG.

In some embodiments, the standard mode corresponds to the secure phase-based ranging procedure (as discussed herein) that generates a secure phase-based ranging result that is shared with the MCU subsystem 130 via the low-speed path 124. In some embodiments, the standard mode corresponds to the DF procedure (as discussed herein) that generates a DF result that is shared with the MCU subsystem 130 via the low-speed path 124.

In some embodiments, the enhanced proprietary mode corresponds to the secure phase-based ranging procedure (as discussed herein) that generates a secure phase-based ranging result that is shared with the MCU subsystem 130 via the high-speed path 126. In some embodiments, the enhanced proprietary mode corresponds to the DF procedure (as discussed herein) that generates a DF result that is shared with the MCU subsystem 130 via the high-speed path 126.

At operation 204, in some embodiments, a mode selector 202 determines whether to run the standard mode or the enhanced proprietary mode. In some embodiments, the intelligent mode selector may make this determination based on one or more of a radio frequency (RF) quality, a local ToA-ToD quality, a phase measurement quality, a local agile multi-path or interference detection, a current angle in which the BT system 100 is with respect to another wireless device, or an override mode (e.g., as determined based on an override indicator and/or signal) that allows "locked" mode selection by the user. In some embodiments, the intelligent mode selector may be a component of the BT subsystem 102 or the MCU subsystem 130.

If the standard mode is enabled, then the BT system 100 performs the secure phase-based ranging and/or DF procedures according to the standard mode by proceeding to operation 206. At operation 206, the BT system 100 uses its hardware to capture data. At operation 208, the BT processing device 108 performs minimal processing on the capture data. For example, the BT processing device 108 samples/captures the data using a lower sampling rate (e.g., 1 MHz) than that which the BT processing device 108 is capable (e.g., 12 MHz). At operation 210, the BT processing device 108 produces data/results that are complaint to the BT specification, where the data/results have a reduced accuracy as compared to that which is capable by the hardware (e.g., BT modem 104 in FIG. 1) of the BT system 100.

If the enhanced proprietary mode is enabled, then the BT subsystem 102 performs the secure phase-based ranging and/or DF procedures according to the enhanced proprietary mode by proceeding to operation 212. At operation 212, the BT subsystem 102 uses its hardware to capture full data. For example, the BT processing device 108 samples/captures full data using a higher sampling rate (e.g., 12 MHz) than that which is required by the BT specification (e.g., 1 MHz). At operation 214, the BT processing device 108 passes the full data to the MCU subsystem 130 via the IPC path 122. At operation 216, the MCU processing device 138 performs high-performance processing on the capture data. At operation 218, the MCU processing device 138 produces a first set of data/results that are complaint to the BT specification and a second data/results that are not compliant to the BT specification, but are more accurate than the first set of data/results. At operation 220, the MCU processing device 138 sends the first and second sets of data/results to a customer application/user interface (UI) executing on the MCU processing device 138 or executing on a separate device (e.g., a host device).

Figure 3:
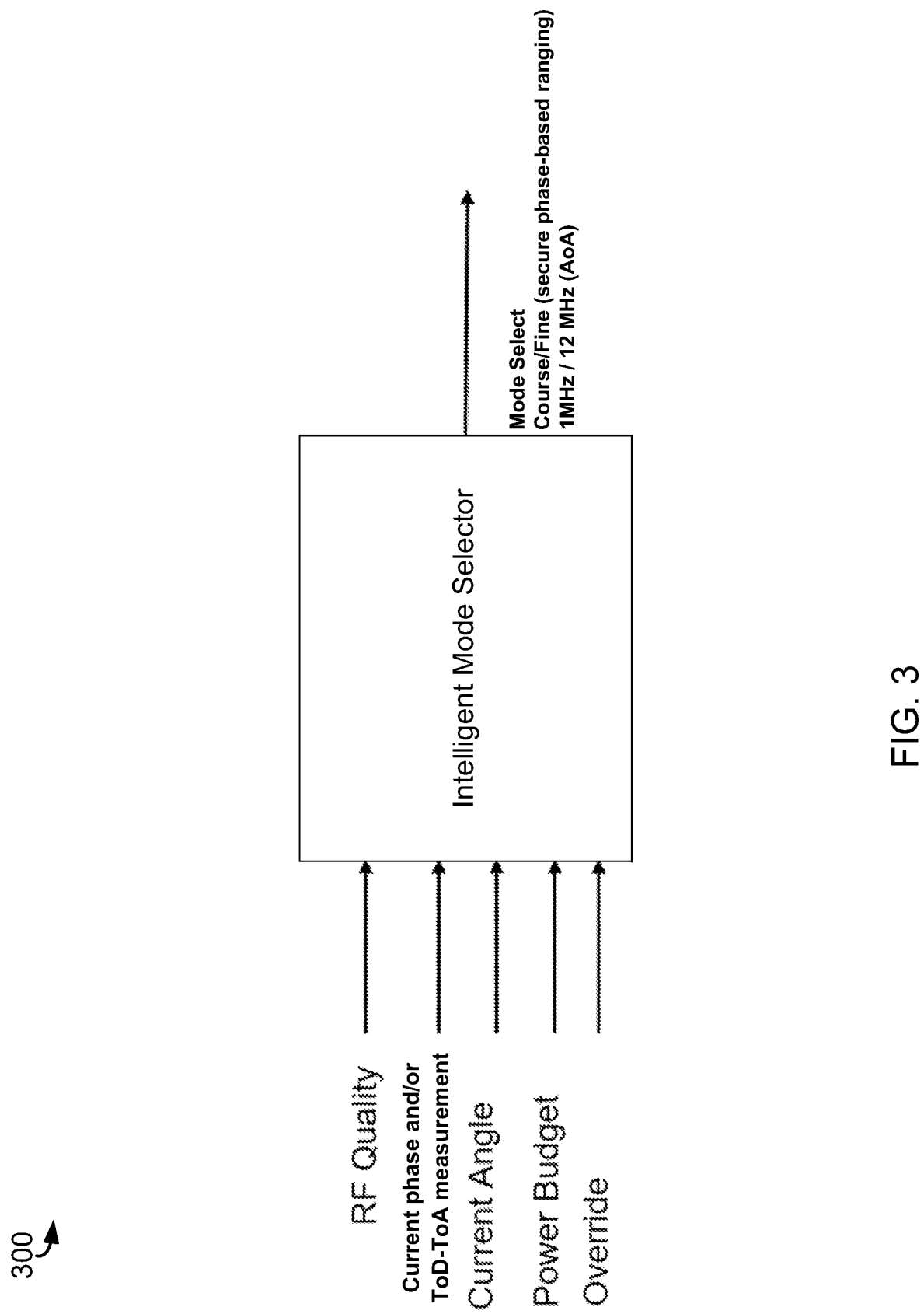
FIG. 3 illustrates a block diagram of an example mode selector for selecting between a standard mode and an enhanced proprietary mode, according to some embodiments.

FIG. 3 illustrates a block diagram of an example intelligent mode selector for selecting between a standard mode and an enhanced proprietary mode, according to some embodiments. The intelligent mode selector 300 is configured to determine whether to run (e.g., execute, perform) the standard mode or the enhanced proprietary mode. In some embodiments, the intelligent mode selector may make this determination based on values and/or thresholds indicative of one or more of a radio frequency (RF) quality (e.g., Access Address Quality, RSSI, calculation quality), a current distance of the BT system 100 to another wireless device, a current angle in which the BT system 100 is with respect to another wireless device, a power budget (e.g., state of battery or battery power level), or an override mode that allows "locked" mode selection by the user. In some embodiments, the intelligent mode selector may be a component of the BT subsystem 102 or the MCU subsystem 130.

In some embodiments, at larger distances the intelligent mode selector 300 may determine that a higher accuracy is not necessary, and therefore select a standard mode (e.g., a BT HCI standard mode, a coarse mode), but then run the enhanced proprietary mode when the distance becomes sufficiently small.

In some embodiments, once the intelligent mode selector detects that the level of RSSI is less than threshold, it chooses locally to switch from the standard mode to the enhanced proprietary mode, in an agile manner. In some embodiments, in case of secure phase-based ranging and Time of Arrival (ToA) estimation, an algorithm in the intelligent mode selector may decide to switch to the enhanced proprietary mode to post-process the raw IQ samples and to better estimate the ToA of the packet. In some embodiments, the decision of the intelligent mode selector may be chosen based on local-agile detection of interference (or multipath fading) on one particular channel.

Figure 4:
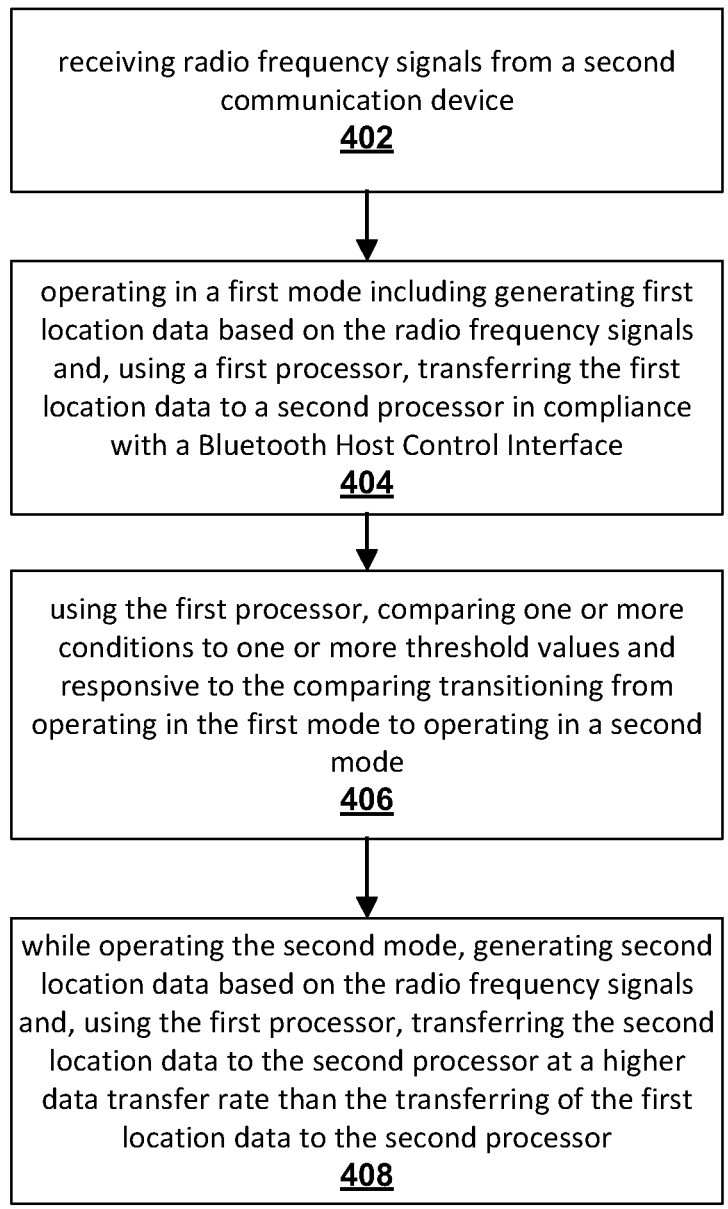
FIG. 4 is a flow diagram of a method for determining the location of wireless devices using different modes of operation.

FIG. 4 is a flow diagram of a method for determining the location of wireless devices include the secure phase-based ranging procedure and the Direction Finding procedure, according to some embodiments. Although the operations are depicted in FIG. 4 as integral operations in a particular order for purposes of illustration, in other implementations, one or more operations, or portions thereof, are performed in a different order, or overlapping in time, in series or parallel, or are omitted, or one or more additional operations are added, or the method is changed in some combination of ways. In some embodiments, the method 400 may be performed by processing logic that comprises hardware (e.g., circuitry, dedicated logic, programmable logic, microcode, etc.), firmware, or a combination thereof. In some embodiments, some or all operations of method 400 may be performed by one or more components of the BT system 100 in FIG. 1.

The method 400, in some embodiments, includes the operation 402 of receiving radio frequency signals from a second communication device.

The method 400, in some embodiments, includes the operation 404 of operating in a first mode including generating first location data based on the radio frequency signals and, using a first processor, transferring the first location data to a second processor in compliance with a Bluetooth Host Control Interface.

The method 400, in some embodiments, includes the operation 406 of using the first processor, comparing one or more conditions to one or more threshold values and responsive to the comparing transitioning from operating in the first mode to operating in a second mode.

The method 400, in some embodiments, includes the operation 408 of while operating the second mode, generating second location data based on the radio frequency signals and, using the first processor, transferring the second location data to the second processor at a higher data transfer rate than the transferring of the first location data to the second processor.

In the above description, some portions of the detailed description are presented in terms of algorithms and symbolic representations of operations on analog signals and/or digital signals or data bits within a non-transitory storage medium. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

Reference in the description to "an embodiment," "one embodiment," "an example embodiment," "some embodiments," and "various embodiments" means that a particular feature, structure, step, operation, or characteristic described in connection with the embodiment(s) is included in at least one embodiment of the disclosure. Further, the appearances of the phrases "an embodiment," "one embodiment," "an example embodiment," "some embodiments," and "various embodiments" in various places in the description do not necessarily all refer to the same embodiment(s).

The description includes references to the accompanying drawings, which form a part of the detailed description. The drawings show illustrations in accordance with exemplary embodiments. These embodiments, which may also be referred to herein as "examples," are described in enough detail to enable those skilled in the art to practice the embodiments of the claimed subject matter described herein. The embodiments may be combined, other embodiments may be utilized, or structural, logical, and electrical changes may be made without departing from the scope and spirit of the claimed subject matter. It should be understood that the embodiments described herein are not intended to limit the scope of the subject matter but rather to enable one skilled in the art to practice, make, and/or use the subject matter.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "generating," "performing," "sending," "determining," or the like, refer to the actions and processes of an integrated circuit (IC) controller, or similar electronic device, that manipulates and transforms data represented as physical (e.g., electronic) quantities within the controller's registers and memories into other data similarly represented as physical quantities within the controller memories or registers or other such information non-transitory storage medium.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an embodiment" or "one embodiment" throughout is not intended to mean the same embodiment or embodiment unless described as such.

Embodiments described herein may also relate to an apparatus (e.g., such as an AC-DC converter, and/or an ESD protection system/circuit) for performing the operations herein. This apparatus may be specially constructed for the required purposes, or it may comprise firmware or hardware logic selectively activated or reconfigured by the apparatus. Such firmware may be stored in a non-transitory computer-readable storage medium, such as, but not limited to, read-only memories (ROMs), random access memories (RAMs), EPROMs, EEPROMs, flash memory, or any type of media suitable for storing electronic instructions. The term "computer-readable storage medium" should be taken to include a single medium or multiple media that store one or more sets of instructions. The term "computer-readable medium" shall also be taken to include any medium that is capable of storing, encoding, or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The above description sets forth numerous specific details such as examples of specific systems, components, methods, and so forth, in order to provide a good understanding of several embodiments of the present disclosure. It is to be understood that the above description is intended to be illustrative and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method of a first communication device, comprising:
 receiving radio frequency signals from a second communication device;
 selecting, based on a maximum data transfer rate of a first data path, a first sample rate for generating first location data;
 selecting, based on a maximum data transfer rate of a second data path, a second sample rate for generating second location data;
 operating in a first mode including generating the first location data by sampling the radio frequency signals at the first sample rate and, using a first processor, transferring the first location data to a second processor over the first data path and in compliance with a Bluetooth Host Control Interface;
 using the first processor, comparing one or more conditions to one or more threshold values and responsive to the comparing, transitioning from operating in the first mode to operating in a second mode; and
 while operating the second mode, generating second location data by sampling the radio frequency signals at the second sample rate, and using the first processor, transferring the second location data to the second processor over the second data path and at a higher data transfer rate than the transferring of the first location data to the second processor, wherein the second location data includes in-phase and quadrature phase (I/Q) data and the first location data does not include the I/Q data.

2. The method of claim 1, wherein the comparing the one or more conditions comprises at least one of comparing a value indicative of a distance, comparing a value indicative of a battery power level, and comparing a value indicative of signal quality.

3. The method of claim 1, wherein the second sample rate is greater that the first sample rate.

4. The method of claim 3, wherein the first sample rate is 1 megahertz (MHz).

5. The method of claim 1, wherein the first location data comprises time and phase data values.

6. The method of claim 1, wherein the first data path has a maximum data transfer rate that is lower than that of the second data path.

7. The method of claim 6, wherein the transferring the second location data to the second processor includes transferring the second location data to a portion of a memory that is shared by the first processor and the second processor.

8. The method of claim 7, further comprising:
sending a message to the second processor to cause the second processor to retrieve the second location data from the portion of the memory.

9. The method of claim 1, further comprising:
using the second processor, executing at least one of a phase-based ranging algorithm and a direction finding algorithm to generate one or more location measurement values associated with the second communication device.

10. A communication device, comprising:
a radio frequency (RF) modem configured to:
receive radio frequency signals from a second communication device; and
a first processor configured to:
select, based on a maximum data transfer rate of a first data path, a first sample rate for generating first location data;
select, based on a maximum data transfer rate of a second data path, a second sample rate for generating second location data;
operate in a first mode to generate the first location data by sampling the radio frequency signals at the first sample rate and transfer the first location data to a second processor in compliance with a Bluetooth Host Control Interface;
compare one or more conditions to one or more threshold values; and
transition, responsive to the comparing, from operating in the first mode to operating in a second mode; and
while operating in the second mode, generate the second location data by sampling the radio frequency signals at the second sample rate and transfer the second location data to the second processor at a higher data transfer rate than the transferring of the first location data to the second processor, wherein the second location data is based on the radio frequency signals, wherein the second location data includes in-phase and quadrature phase (I/Q) data and the first location data does not include the I/Q data.

11. The communication device of claim 10, wherein the first processor further configured to at least one of:
compare a value indicative of a distance, compare a value indicative of a battery power level, and compare a value indicative of signal quality.

12. The communication device of claim 10, wherein the second sample rate is greater that the first sample rate.

13. The communication device of claim 12, wherein the first sample rate is 1 megahertz (MHz).

14. The communication device of claim 10, wherein the first location data comprising time and phase data values.

15. The communication device of claim 10, wherein the first processor further configured to:
transfer the first location data over the first data path; and
transfer the second location data over the second data path.

16. The communication device of claim 15, wherein the first data path has a maximum data transfer rate that is lower than that of the second data path.

17. The communication device of claim 15, wherein the first processor further configured to:
transfer the second location data to a portion of a memory that is shared with the second processor.

18. The communication device of claim 17, wherein the first processor further configured to:
send a message to the second processor to cause the second processor to retrieve the second location data from the portion of the memory.

19. The communication device of claim 10, further comprising the second processor, wherein the second processor is configured to:
execute at least one of a phase-based ranging algorithm and a direction finding algorithm to generate one or more location measurement values associated with the second communication device.

20. A system, comprising:
a first processor and a second processor;
a first data path and a second data path that are each coupled between the first processor and the second processor; and
a radio frequency (RF) modem coupled to the first processor,
wherein the RF modem is configured to:
receive radio frequency signals;
wherein the first processor is configured to:
select, based on a maximum data transfer rate of a first data path, a first sample rate for generating first location data;
select, based on a maximum data transfer rate of a second data path, a second sample rate for generating second location data;
operate in a first mode to transfer the first location data to the second processor via the first data path, the first location data is generated based on the radio frequency signals and the first sample rate;
compare one or more conditions to one or more threshold values; and
transition, responsive to the comparing, from operating in the first mode to operating in a second mode; and
while operating in the second mode, transfer the second location data to the second processor via the second data path, the second location data is generated based on the radio frequency signals and the second sample rate, wherein the second location data includes in-phase and quadrature phase (I/Q) data and the first location data does not include the I/Q data.

* * * * *